Nov. 25, 1958    S. SODERBERG    2,861,456
FLEXIBLE STEM SEAL
Filed Oct. 8, 1954

INVENTOR
Sten Soderberg
BY
*Pennie, Edmonds, Morton, Barrows & Taylor*
ATTORNEYS

United States Patent Office 2,861,456
Patented Nov. 25, 1958

2,861,456

FLEXIBLE STEM SEAL

Sten Soderberg, Nutley, N. J., assignor to Leslie Co., Lyndhurst, N. J., a corporation of New Jersey Application October 8, 1954, Serial No. 461,116

2 Claims. (Cl. 74—18.2)

This invention relates to stem seals, and more particularly to an improved rubber bellows construction which will eliminate bunching of the bellows around a movable stem when the stem moves in a surrounding bore.

In many forms of valves, valve controls, and the like, a movable stem is mounted in a bore of greater diameter than the stem, and a rubber bellows extends across the space between the bore and the stem to confine fluid either above or below the bellows. The portion of the bellows extending across the space between the stem and the bore is thus flexed on each movement of the stem. In prior art constructions, the bellows was molded in the form of an outer flange or disc portion to be secured to the bore, an inner flange or disc portion to be received by the stem, and a connecting portion. This connecting portion has heretofore consisted of a cylindrical portion of substantially the diameter of the bore, and a curved or looped portion connecting the cylindrical portion to the inner flange or disc. In such construction the cylindrical portion lies along the inner wall of the bore when the stem is in one position. But as the stem moves to its second position, it rolls up on the stem and, being of larger diameter than the stem, it bunches causing creases in the rubber which shorten the life of the bellows. If the stem and bore are made of nearly the same diameter, there is a tendency to pinch the rubber and puncture it.

In the present invention, I provide a bellows in which the outer flange extends substantially half across the space between the bore and the stem. The connecting cylindrical portion, in normal position, is disposed midway between the bore and stem and connected to the loop which is in turn connected to the inner flange. When pressure is applied, the outer cylindrical portion is expanded until it is backed up by the bore and when the stem is moved, the bellows assumes a position against the stem, but the bunching heretofore encountered is avoided. The stem enlarged at this point to substantially the same diameter as that of the bellows portion, in which case there will be no excess rubber and the bellows will assume its position around the stem with no bunching. The enlargement of the stem will leave ample room to prevent pinching of the rubber when the stem is moved.

In the accompanying drawing, I have shown one embodiment of the invention. In this showing:

Figure 1:
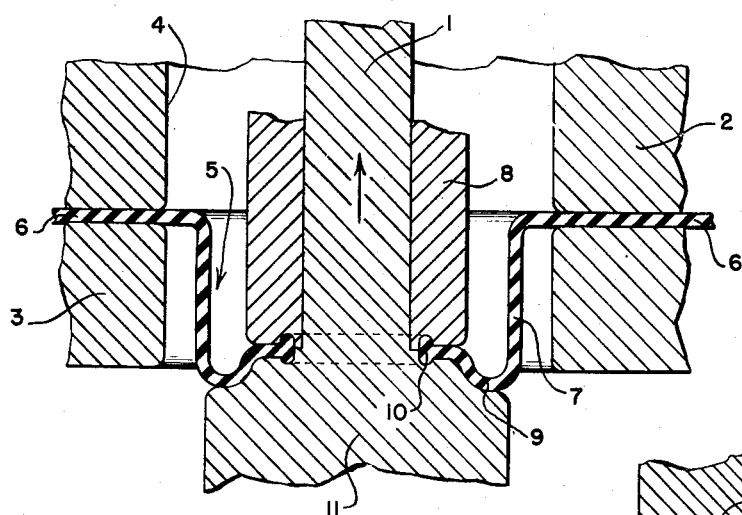
Fig. 1 is a vertical, sectional view of an installation of the bellows packing with the stem in one position.

In the drawings the reference numeral 1 designates a stem, such as a valve stem, the upper end of which may, for instance, extend into a diaphragm casing or chamber (not shown) and be connected to a diaphragm therein (not shown). In the drawing it is assumed that a fluid is delivered to such diaphragm chamber beneath the diaphragm in which case the stem 1 will be moved upwardly as indicated by the arrow. The stem usually passes through members, such as the wall of the diaphragm chamber or the like, which are designated by reference numerals 2 and 3, and these members are provided with a bore 4 for the reception of the stem 1, the bore being of greater diameter than the stem, as shown. The upper part of the bore 4 is open to the fluid in the diaphragm chamber and a bellows packing extends across the bore, being secured to the stem and to the members 2 and 3, to prevent leakage of the fluid beyond the packing.

The improved construction of the bellows 5 is the subject matter of the present invention. The bellows is formed of rubber or of a rubber composition and is initially molded in the shape shown in Fig. 1. As shown, an outer flat section or flange 6 is clamped between the members 2 and 3. Section 6 is connected to cylindrical section 7. In similar packings of the prior art the section 7 is intially molded of the same diameter as bore 4, and when there is no pressure on it, it assumes a position against the inner wall of bore 4. It will be noted that in the present construction, the diameter of cylindrical section 7 is substantially less than that of the bore and substantially greater than that of the adjacent portion 8 of the stem. Thus when there is no pressure on the bellows, as illustrated in Fig. 1, section 7 assumes a position midway between the stem and the wall of the bore.

Figure 2:
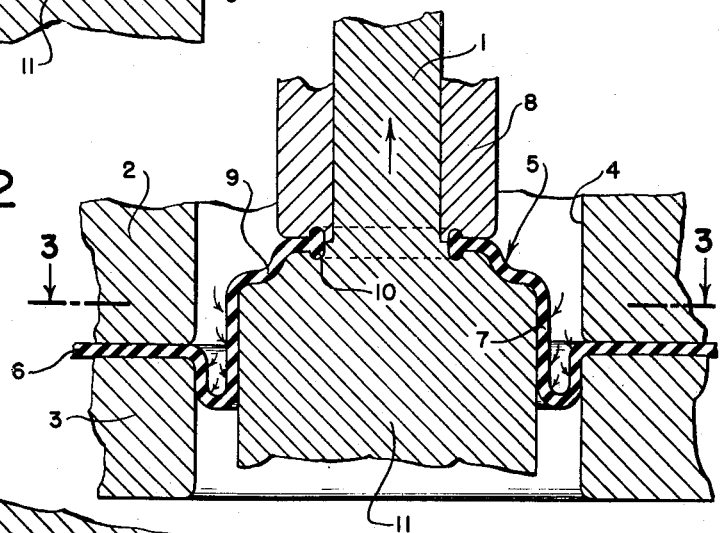
Fig. 2 is a similar view with the stem in a second position.
Figure 3:
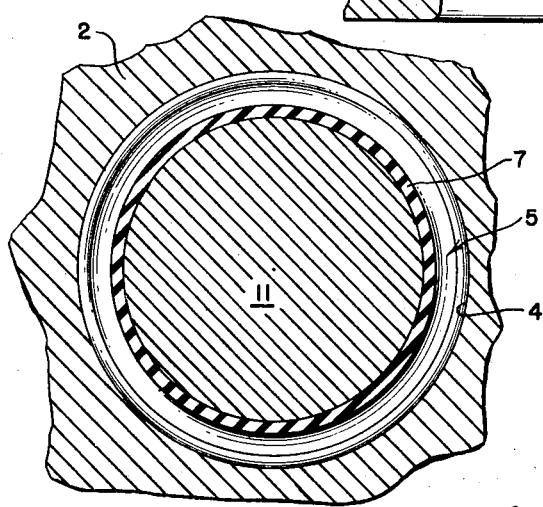
Fig. 3 is a horizontal, sectional view on line 3—3 of Fig. 2.

The other end of section 7 is connected to a loop 9 and the loop in turn is connected to an inner flange or disc 10 which is secured to the stem. As shown, the inner flange 10 may be secured between the stem proper and the part 8 mounted on the stem. With a packing of this type, and assuming the stem to be connected to a diaphragm with pressure on the under side of the diaphragm moving the stem upwardly as shown in Fig. 2, the fluid indicated by the small arrows causes a portion of section 7 to roll up on the stem. It will be apparent that in prior constructions, with the diameter of this portion equal to that of the bore, the material would bunch around the stem forming creases in the rubber and shortening the life of the bellows. This bunching is materially decreased by making the section 7 of a diameter intermediate that of the section 8 of the stem and the diameter of the bore and without further change. But to obtain the best results, portion 11 of the stem just beyond the diaphragm is made of substantially the same diameter of section 7 of the bellows. There is then little or no excessive rubber when the section 7 is rolled against the stem by the pressure of the fluid the bellows is smooth and bunching is eliminated as indicated in Fig. 3. This greatly lengthens the life of the packing and results in more satisfactory operation.

I claim:

1. A bellows seal comprising a surrounding member having a bore, a stem movably mounted in the bore, the stem being of smaller diameter than the bore, and a seal of flexible material secured to the surrounding member and to the stem and extending across the bore to prevent flow of fluid beyond the seal, the portion of the seal extending across the space between the wall of the bore and the stem including a cylindrical portion normally occupying a position intermediate the wall and the stem, the stem beyond the seal being enlarged and being of substantially the same diameter as the cylindrical portion of the seal whereby when pressure is applied and the stem moved, the cylindrical portion of the seal will occupy a position around the enlarged portion of the stem while in a relaxed condition and will be rolled thereon without bunching.

2. A bellows seal comprising a surrounding member having a bore, a stem slidably mounted in the bore, the stem being of smaller diameter than the bore, and a seal of flexible material secured to the surrounding member and to the stem and extending across the bore to prevent flow of fluid beyond the seal, the seal comprising a molded body having an outer portion secured to the bore, an intermediate substantially cylindrical portion disposed between and spaced from the wall of the bore and the stem and an inner portion secured to the stem, the stem beyond the seal being enlarged and being of substantially the same diameter as the cylindrical portion of the seal, the intermediate cylindrical portion of the seal being rolled upon the enlarged portion of the stem in a relaxed condition and without bunching when the stem is moved in the bore.

References Cited in the file of this patent

UNITED STATES PATENTS

| | | |
|---|---|---|
| 821,926 | Cornish | May 29, 1906 |
| 957,347 | Kennedy | May 10, 1910 |
| 2,702,023 | Seeloff | Feb. 15, 1955 |

FOREIGN PATENTS

| | | |
|---|---|---|
| 971,102 | France | Jan. 12, 1951 |